United States Patent
Zhang et al.

(10) Patent No.: US 12,556,539 B2
(45) Date of Patent: Feb. 17, 2026

(54) DETECTING MISCONFIGURATION OF GUEST ACCOUNT SECURITY PERMISSIONS

(71) Applicant: Salesforce, Inc., San Francisco, CA (US)

(72) Inventors: Xiao Zhang, Bellevue, WA (US); Vijay Erramilli, New York, NY (US); Anuj Gargeya Malkapuram, San Francisco, CA (US); Lintang Prasojo, Melbourne (AU); Avinash Reddy Thumma, Telangana (IN)

(73) Assignee: Salesforce, Inc., San Francisco, CA (US)

( * ) Notice: Subject to any disclaimer, the term of this patent is extended or adjusted under 35 U.S.C. 154(b) by 226 days.

(21) Appl. No.: 18/428,233

(22) Filed: Jan. 31, 2024

(65) Prior Publication Data

US 2025/0247393 A1 Jul. 31, 2025

(51) Int. Cl.
*H04L 9/40* (2022.01)
*H04L 67/50* (2022.01)

(52) U.S. Cl.
CPC .......... *H04L 63/101* (2013.01); *H04L 63/104* (2013.01); *H04L 63/1425* (2013.01); *H04L 67/535* (2022.05)

(58) Field of Classification Search
CPC ... H04L 63/101; H04L 67/535; H04L 63/104; H04L 63/1425
USPC ......................................................... 709/225
See application file for complete search history.

(56) References Cited

U.S. PATENT DOCUMENTS

| | | | | |
|---|---|---|---|---|
| 9,166,993 | B1 * | 10/2015 | Liu | H04L 63/1425 |
| 9,407,652 | B1 * | 8/2016 | Kesin | H04L 67/535 |
| 9,558,347 | B2 * | 1/2017 | Chari | H04L 63/1483 |
| 9,641,544 | B1 * | 5/2017 | Treat | H04L 43/04 |
| 10,291,637 | B1 * | 5/2019 | Bardenstein | G06F 21/552 |

(Continued)

OTHER PUBLICATIONS

Thijs van Ede, Niek Khasuntsev, Bas Steen, and Andrea Continella. 2022. Detecting Anomalous Misconfigurations in AWS Identity and Access Management Policies. In Proceedings of the 2022 on Cloud Computing Security Workshop (CCSW'22). Association for Computing Machinery, New York, NY, USA, 63-74. (Year: 2022).*

(Continued)

*Primary Examiner* — Taylor A Elfervig
(74) *Attorney, Agent, or Firm* — Butzel Long (57) ABSTRACT

Systems, devices, and techniques are disclosed for detecting misconfiguration of guest account security permissions. User personas may be generated from user activity data generated by access using guest accounts to controllers of a cloud computing server system. Clusters of user personas may be generated from the user personas. Anomalous user personas may be identified based on the clusters of user personas. A database query that was made to a database of the cloud computing server system, is associated with an identified user persona, and requested sensitive data may be identified from database query logs. A size of a response from the database to the identified database query may be identified from the database query logs. The size of the response may indicate that the response included the sensitive data. The cloud computing server system may prevent use of the guest account associated with the user persona.

20 Claims, 4 Drawing Sheets

(56) References Cited

U.S. PATENT DOCUMENTS

| | | | | |
|---|---|---|---|---|
| 10,341,372 | B2* | 7/2019 | Chari | H04L 63/1425 |
| 10,740,359 | B1* | 8/2020 | Browne | G06F 16/9535 |
| 10,757,122 | B2* | 8/2020 | Vasudevan | H04L 67/306 |
| 11,341,001 | B1* | 5/2022 | Brahmadesam | G06F 11/1471 |
| 11,416,379 | B1* | 8/2022 | Petrescu | G06F 8/60 |
| 11,501,013 | B1* | 11/2022 | Das | G06F 21/55 |
| 11,799,879 | B2* | 10/2023 | Singh | H04L 63/102 |
| 11,803,766 | B1* | 10/2023 | Srinivasan | G06N 5/04 |
| 2008/0319889 | A1* | 12/2008 | Hammad | G06Q 20/403 |
| | | | | 705/35 |
| 2010/0257580 | A1* | 10/2010 | Zhao | H04L 63/1416 |
| | | | | 726/1 |
| 2011/0107418 | A1* | 5/2011 | Bhagwan | G06F 21/604 |
| | | | | 706/45 |
| 2014/0123031 | A1* | 5/2014 | Postrel | G06F 3/0484 |
| | | | | 715/753 |
| 2015/0143532 | A1* | 5/2015 | Toffa | G06F 21/6254 |
| | | | | 726/26 |
| 2015/0180894 | A1* | 6/2015 | Sadovsky | H04W 12/12 |
| | | | | 726/22 |
| 2015/0350902 | A1* | 12/2015 | Baxley | H04W 4/90 |
| | | | | 726/7 |
| 2016/0241576 | A1* | 8/2016 | Rathod | H04L 63/1425 |
| 2016/0350165 | A1* | 12/2016 | LeMond | G06F 11/079 |
| 2018/0084080 | A1* | 3/2018 | Bajaj | H04L 67/535 |
| 2018/0288063 | A1* | 10/2018 | Koottayi | G06F 21/50 |
| 2019/0197492 | A1* | 6/2019 | Shah | G06Q 50/01 |
| 2019/0199731 | A1* | 6/2019 | Park | H04L 63/102 |
| 2020/0005319 | A1* | 1/2020 | Scarborough | G06Q 10/087 |
| 2021/0240729 | A1* | 8/2021 | Grant | H04L 67/306 |
| 2021/0374058 | A1* | 12/2021 | Chandrasekaran | G06F 21/45 |
| 2022/0014533 | A1* | 1/2022 | Almaz | H04L 43/16 |
| 2022/0286472 | A1* | 9/2022 | Khalil | H04L 63/1425 |
| 2022/0407898 | A1* | 12/2022 | Grant | H04L 63/104 |
| 2023/0110080 | A1* | 4/2023 | Hen | H04L 63/105 |
| | | | | 726/4 |
| 2023/0120871 | A1* | 4/2023 | Mohan | G06Q 30/0269 |
| | | | | 705/3 |
| 2023/0245174 | A1* | 8/2023 | Rajasekaran | G06Q 30/0631 |
| | | | | 705/14.66 |
| 2023/0262072 | A1* | 8/2023 | Cambric | G06N 3/08 |
| | | | | 726/22 |
| 2023/0267198 | A1* | 8/2023 | Karpovsky | G06F 21/552 |
| | | | | 726/23 |
| 2023/0334478 | A1* | 10/2023 | Szigeti | G06Q 20/405 |
| 2023/0344842 | A1* | 10/2023 | Akhtar | H04L 63/1425 |
| 2023/0409723 | A1* | 12/2023 | Jhaveri | G06F 21/6218 |
| 2023/0419402 | A1* | 12/2023 | Ghelichi | G06N 5/01 |
| 2024/0146738 | A1* | 5/2024 | Thimmareddy | H04L 63/104 |
| 2024/0241916 | A1* | 7/2024 | Shao | G06F 16/906 |
| 2024/0330445 | A1* | 10/2024 | Shavit | G06F 21/562 |
| 2025/0047661 | A1* | 2/2025 | Berbenetz | H04L 67/306 |
| 2025/0061194 | A1* | 2/2025 | Grover | G06F 21/316 |
| 2025/0061222 | A1* | 2/2025 | Thimmareddy | G06F 21/6218 |
| 2025/0141736 | A1* | 5/2025 | Chen | H04L 41/0886 |
| 2025/0168181 | A1* | 5/2025 | Liu | G06N 3/045 |

OTHER PUBLICATIONS

O. Hussein, "Identification of Threats and Vulnerabilities in Public Cloud-Based Apache Hadoop Distributed File System," 2019 15th International Computer Engineering Conference (ICENCO), Cairo, Egypt, 2019, pp. 44-49 (Year: 2019).*

Q. Hu, B. Tang and D. Lin, "Anomalous User Activity Detection in Enterprise Multi-source Logs," 2017 IEEE International Conference on Data Mining Workshops (ICDMW), New Orleans, LA, USA, 2017, pp. 797-803, (Year: 2017).*

M. Faraji, J.-M. Kang, H. Bannazadeh and A. Leon-Garcia, "Identity access management for Multi-tier cloud infrastructures," 2014 IEEE Network Operations and Management Symposium (NOMS), Krakow, Poland, 2014, pp. 1-9 (Year: 2014).*

Rahul Potharaju, Joseph Chan, Luhui Hu, Cristina Nita-Rotaru, Mingshi Wang, Liyuan Zhang, and Navendu Jain. 2015. ConfSeer: leveraging customer support knowledge bases for automated misconfiguration detection. Proc. VLDB Endow. 8, Aug. 12, 2015, 1828-1839. (Year: 2015).*

M. S. Parwez, D. B. Rawat and M. Garuba, "Big Data Analytics for User-Activity Analysis and User-Anomaly Detection in Mobile Wireless Network," in IEEE Transactions on Industrial Informatics, vol. 13, No. 4, pp. 2058-2065, Aug. 2017, (Year: 2017).*

R. H. Elghanuni, M. A. M. Ali and M. B. Swidan, "An Overview of Anomaly Detection for Online Social Network," 2019 IEEE 10th Control and System Graduate Research Colloquium (ICSGRC), Shah Alam, Malaysia, 2019, pp. 172-177 (Year: 2019).*

B. Santos, B. Dzogovic, B. Feng, N. Jacot, V. T. Do and T. V. Do, "Improving Cellular IoT Security with Identity Federation and Anomaly Detection," 2020 5th International Conference on Computer and Communication Systems (ICCCS), Shanghai, China, 2020, pp. 776-780 (Year: 2020).*

B. Wang, R. Jin, S. Zhang and X. Zhao, "Research on Gravity-Based Anomaly Intrusion Detection Algorithm," 2009 Fifth International Conference on Information Assurance and Security, Xi'an, China, 2009, pp. 350-353 (Year: 2009).*

P. Mishra, V. Varadharajan, U. Tupakula and E. S. Pilli, "A Detailed Investigation and Analysis of Using Machine Learning Techniques for Intrusion Detection," in IEEE Communications Surveys & Tutorials, vol. 21, No. 1, pp. 686-728, Firstquarter 2019, (Year: 2019).*

Anisa Allahdadi, Ricardo Morla, "Anomaly Detection and Modeling in 802.11 Wireless Networks", Journal of Network and Systems Managemen, Springer Science and Business Media LLC, vol. 27, 2018, p. 3-38 (Year: 2018).*

M.-A. Kourtis, G. Xilouris, G. Gardikis and I. Koutras, "Statistical-based anomaly detection for NFV services," 2016 IEEE Conference on Network Function Virtualization and Software Defined Networks (NFV-SDN), Palo Alto, CA, USA, 2016, pp. 161-166, (Year: 2016).*

* cited by examiner

DETECTING MISCONFIGURATION OF GUEST ACCOUNT SECURITY PERMISSIONS

BACKGROUND

Software-as-a-Service (SaaS) providers may develop and maintain platforms that may allow their customers to use cloud-based applications over the Internet. A multi-tenant cloud computing server system may have many tenants that each run SaaS applications that may have access to databases. Misconfigurations of security settings by a tenant may allow users of that tenant's SaaS application unauthorized access to sensitive data in the databases, including customer data. This may result in data breaches. It may be difficult for a multi-tenant cloud computing server system to detect security setting misconfigurations made by its tenants, as the server system itself may have limited visibility on tenant's security settings due to issues with data privacy and data collection. Tenants may be able to customize their security settings for their own purposes, so there may be no security settings benchmark that can be used as a point of comparison for the tenants' security settings. In particular, it may be difficult for the sever system to determine when a tenant's permissions for guest accounts are too permissive and allow users of the guest accounts access to sensitive data in the databases that users of guest account should not be able to access. This is because the permissions for guest accounts can often not be directly audited by the server system, guest accounts do not require authentication, guest accounts are shared by multiple users, and the level of access to data that a tenant wishes to provide to guest accounts may vary widely between tenants preventing the use of baselines rules for auditing the security settings on guest accounts.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Techniques disclosed herein enable detecting misconfiguration of guest account security permissions, which may allow for the detection of guest accounts that have over-permissive permissions in a multi-tenant cloud computing server system without directly auditing the permissions. User personas may be generated from user activity data generated by access using guest accounts to controllers of a cloud computing server system. Guest accounts may provide access to respective applications hosted on the cloud computing server system. The user personas may be associated with the guest accounts. Clusters of user personas may be generated from the user personas. Anomalous user personas may be identified based on the clusters of user personas. Database queries that were made to a database of the cloud computing server system, are associated with the user personas identified as anomalous, and requested sensitive data may be identified from database query logs. Responses from the database to the identified database queries where the sizes of the responses indicate that the responses included the sensitive data that was requested in the database queries may be identified from application logs. Use of the guest accounts associated with user personas that were identified as anomalous and are associated with identified database queries that received at least one identified response may be prevented by the cloud computing system.

A multi-tenant cloud computing server system may host SaaS applications for tenants of the cloud computing server system. Tenants may also have databases on the cloud computing server system that may be used by the tenant's applications. Users may authenticate themselves to the application with user accounts in order to use the application, for example, logging-in with a username and password or other type of credential through a website or client application on the user's computing device. There may be different types of user accounts for an application. The security settings for the application, as set by the tenant, may give different permissions to different types of user accounts. The permissions for a type of user account for a tenant's application may include which of the tenant's databases and which data in the databases the user account may be used to access through the application. Most user accounts of any type may be associated with an individual user to whom the account was issued. An application may also have a guest account. The guest account for an application may not be associated with any individual user and may be used by any user to access the application. The guest account may not require any form of authentication to use. The security settings for the application set by the tenant may also include permissions for the guest account. Permissions for a guest account for an application may limit the access to databases and data more than permissions for user accounts of other types for that application due to the guest account not being associated with an individual user and not requiring authentication to use. Misconfiguring the security permissions for a guest account may permit users of the guest account to access sensitive data that they should not be able to access. Each application on the cloud computing server system may have its own, separate, guest account.

User personas may be generated from user activity data generated by access using guest accounts to controllers of a cloud computing server system. A user who accesses an application using a guest account may interact with various controllers of the cloud computing server system. The controllers may be processes that may run on both cloud computing sever system and on client computing devices and may interact to handle requests for data from the client computing device that is interacting with an application on the cloud computing server system and responses by the application on the cloud computing server system to the request. An application may use several controllers that may be able to, for example, return application data including the tenant's domain, security settings, and objects, return all data from any accessible object, return the record layout metadata for a record ID and layout type, return the record data for a record ID, return a list of objects for an input lookup component, that returns a list of records for a top results component, return the record UI metadata for a record ID and layout type, and run a search on a specified object against an input term or keyword within the specified fields and then return any matching records from the specified object. The controllers may maintain logs of user activity data. An entry for an interaction in the log for a controller may include the user activities which may be the user's interaction with the controller that led to the entry in the controller's log including request identifiers for log entries from controllers that control access to databases through the application, the tenant identifier for the tenant whose application the user is interacting with that resulted in the user interacting with the controller, a user identifier that may identify the user account being used, an IP address of the user, a user-agent header identifying the user agent being used on the client computing device, for example, HTTP user-agent header, and a date the interaction was detected.

User personas may be generated by aggregating user activity data generated through the user of guest accounts from all controllers. User personas may be generated on a per-application, and therefore per-guest account, basis using the tenant identifier and user identifier to separate entries with user activity data in the controller logs by application. Each application on the cloud computing server system may belong to a specific tenant, identifiable through the tenant identifier, and have an identifiable guest account with its own user identifier. A tenant may have multiple applications and each application may have its own guest account with a user identifier that is unique among the tenant's applications, though not necessarily unique on the entire cloud computing server system. User personas may then be generated for the users of a single application's guest account using the first 24 bits of IP addresses, which may include the first three octets and exclude the fourth, host specific, octet, the user-agent headers, and the dates, included in all of the controllers' user activity log entries that are for that application. A single user persona for an application may be generated based on entries in the controller logs for that application that have the same first three octets in their IP addresses, the same user-agent header, and detection dates within a specified time window, for example, within a four window, in addition to having the same tenant identifier and user identifier. A generated user persona may include the data used to generate the user persona, for example, the tenant identifier, user identifier, first three octets of the IP address, user-agent header, and detection dates from all of the log entries that were used in the generation of the user persona, along with other data from the log entries, such as, for example, request identifiers for log entries from controllers that control access to databases through the application. User personas may be generated in this manner for every guest account across every application and every tenant on the cloud computing server system, with the user personas being associated with the guest account they were generated for.

A user persona may be generated based on log entries that were generated by user activities from multiple actual users, as users of the guest account on computing devices that are connected to the same subnet, thus having the first three octets of their IP address being the same and that use the same user agent, for example, same web browser, to access the application on the same data may not be distinguishable. A single actual user may have log entries their user activities used to generate multiple user personas, as the user may use different computing devices that are on different subnets, use different user agents, and access the application at various different times, and their may not be a way to determine that the controller log entries generated by the user are for the same user due to their use of the guest account. This may also result in user personas generated based on only a portion of a log entries for a single user's user activities.

Clusters of user personas may be generated from the user personas. Any suitable clustering, such as K-means clustering, may be applied to all of the user personas generated for all of the applications and guest accounts for all tenants on the cloud computing server system. The generation of the clusters may be based on the data in the user personas, including, for example, the tenant identifier, user identifier, first three octets of IP addresses, user-agent headers, and detection dates.

Anomalous user personas may be identified based on the clusters of user personas. A user persona may be identified as anomalous when the user persona is in a cluster that is small, for example, a cluster that includes less than 2% of the total number of user personas, or the user persona is farther than some threshold distance from the center of the cluster to which the user persona was assigned, for example, the user persona having a sigmoid of its z-score be greater than 0.98.

Database queries that were made to a database of the cloud computing server system, are associated with the user personas identified as anomalous, and requested sensitive data may be identified from database query logs. Users may use guest accounts to access applications and submit database queries to databases that are accessible to the application on the cloud computing server system. For example, a client-side user interface for the application on the client computing device, available, for example, through the user agent, may include elements that a user can use to submit search queries to request data from the databases accessible to the application. User personas may include the request identifiers that were part of the user activity data stored in the controller log entries generated when the user, using an application's guest account, submitted a database query to the application. Entries in the database query logs may include the database queries received from users and request identifiers. The request identifiers included in user personas that were identified as anomalous may be compared to request identifiers in the entries in the database query logs to determine the entries in the database query logs that have request identifiers matching the request identifiers in the anomalous user personas. A database query in an entry in a database query log that has a request identifier that matches the request identifier in an anomalous user persona may be associated with that anomalous user persona.

The database queries that are determined to be associated with anomalous user personas may be evaluated to determine if the database queries requested sensitive data. For example, fields and table names that the database query tried to access may be extracted from the database query. The fields and table names may be assigned sensitivity scores. The sensitivity scores may be assigned by, for example, a large language model (LLM) that may be tuned specifically to evaluate whether the data that might be stored in a database in particular fields and table names is sensitive by integrating data sensitivity classification information for the cloud computing server system. For example, tables having certain naming patterns may indicate that the tables were created by tenants and have sensitive information, for example, customer data, payment data, or other data that a tenant of cloud computing server system would not want to be accessible to users who are using guest accounts. The sensitivity scores may be assigned on any suitable scale, such as, for example, between 0 and 1 with a database query whose extracted fields or table names were either assigned a sensitivity score greater than, for example, 0.9 being considered to have attempted to access sensitive data.

Responses from the database to the identified database queries where the sizes of the responses indicate that the responses included the sensitive data that was requested in the database queries may be identified from application logs. Baseline sizes for responses that returned no data from a database may be established for all of the tables in the databases of the cloud computing server system. The baseline size for a table may be the size of a "no record" response the table's database sent in response to a database query that requested data from the table. The baseline sizes may be generated in any suitable manner, including, for example, simulating the submission of database queries to the databases from user accounts specifically set up without proper permissions to access the data requested in the database queries. The baseline sizes may be stored in any suitable storage of the cloud computing server system.

An application's logs may be checked to determine the size of the response that was sent from the application in response to a database query that was identified as being associated with an anomalous user persona and having requested sensitive data. If the size of the response is higher than baseline size for a "no record" response for the table accessed by the database query by a specified amount, for example, 20% higher, this may indicate that the response sent back to the client computing device from which the database query was received included records with the sensitive data that was requested. Otherwise, if the size of the response is not higher than the baseline size by the specified amount, this may indicate that no records, and thus no sensitive data, were returned to the client computing device.

Use of the guest accounts associated with user personas that were identified as anomalous and are associated with identified database queries that received at least one identified response may be prevented by the cloud computing system. The existence of a user persona, associated with a guest account used to access an application, that was identified as anomalous and was determined to be associated with a database query that was identified as having requested sensitive data and to which a response that was a specified amount over the baseline size was sent by the application may indicate that the guest account associated with the user persona has its security settings misconfigured. The permissions for the guest account may be over-permissive, allowing the guest account to be used to access sensitive data in the databases accessible to the application. The cloud computing server system may automatically prevent use of the guest account, for example, disabling the guest account for that application and notifying that tenant that the guest account has been disabled and needs to have its permissions checked. The cloud computing server system may disable any such guest accounts for any applications belonging to any tenants. This may prevent data breaches due to misconfigured guest accounts that allow users access to sensitive data due to incorrect permissions.

Figure 1:
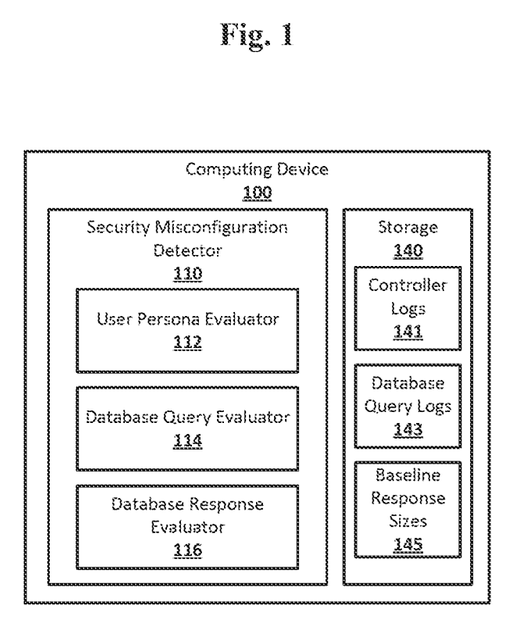
FIG. 1 shows an example system suitable for detecting misconfiguration of guest account security permissions according to an implementation of the disclosed subject matter.

FIG. 1 shows an example system suitable for detecting misconfiguration of guest account security permissions according to an implementation of the disclosed subject matter. A computing device 100 may be, for example, the computer 20 as described in FIG. 5, or components thereof. The computing device 100 may include any number computing devices, each of which may include any suitable combination of central processing units (CPUs), graphical processing units (GPUs), and tensor processing units (TPUs). The computing device 100 may be distributed over any geographic area, and may, for example, include geographically disparate computing devices connected through any suitable network connections. The computing device 100 may be, or be a part of, a cloud computing server system that may support multi-tenancy.

The computing device 100 may include a security misconfiguration detector 110. The security misconfiguration detector 110 may be any suitable combination of hardware and software on the computing device 100 that may be able to detect when guest accounts for applications running on a cloud computing sever system have misconfigured security permissions that may allow users of the guest accounts to access sensitive data.

The security misconfiguration detector 110 may include a user persona evaluator 112, database query evaluator 114, and database response evaluator 116. The user persona evaluator 112 may be a component of the security misconfiguration detector 110 that may generate user personas from controller logs 141, generate clusters from the user personas, and identify anomalous user personas from the clusters. The database query evaluator 114 may be a component of the security misconfiguration detector 110 that may use database query logs 143 to determine whether database queries that are associated with the anomalous user personas requested sensitive data. The data response evaluator 116 may be a component of the security misconfiguration detector 110 that may use the database query logs 143 and baseline response sizes 145 to determine which database queries that are associated with anomalous user personas and requested sensitive data resulted in a responses that had sizes indicating the responses included records with the sensitive data that was requested.

The storage 140 may be any suitable combination of hardware and software for storing data on any suitable physical storage mediums. The storage 140 may store the controller logs 141, the database query logs 143, and the baseline response sizes 145. The controller logs 141 may be logs that include entries with user activity data from user interactions with controllers of a cloud computing server system. The controller logs 141 may include logs for all controllers across all application and all tenants on the cloud computing server system. An entry in a log of the controller logs 141 may include any suitable data from a user interaction, including, for example, a tenant identifier, user identifier, an IP address, a user-agent header, a detection date, and user activities including a request identifier for database queries. The controller logs 141 may be stored in any suitable manner, including any suitable distribution with any suitable form of access control. For example, the logs for different tenants may be stored in a manner such that any tenant only has access to logs for controller interactions that involve that tenant's applications. The database query logs 143 may be logs with entries for database queries received by databases of the cloud computing server system, including request identifiers, fields and tables that the database query attempted to access in the databases, and the size of any data sent in response to the database query. The database query logs 143 may include logs for all of the databases of the cloud computing server system for all of the tenants of the cloud computing server system. The database query logs 143 may be stored in any suitable manner, including any suitable distribution with any suitable form of access control. For example, the logs for different tenants may be stored in a manner such that any tenant only has access to logs for database queries that involve that tenant's applications. The baseline response sizes 145 may include the baseline size of responses to database queries that include records from a database and are not "no record" responses. The baseline response sizes 145 may include the baseline response sizes on a per-table basis for all of the tables in all of the databases on the cloud computing server system.

Figure 2:
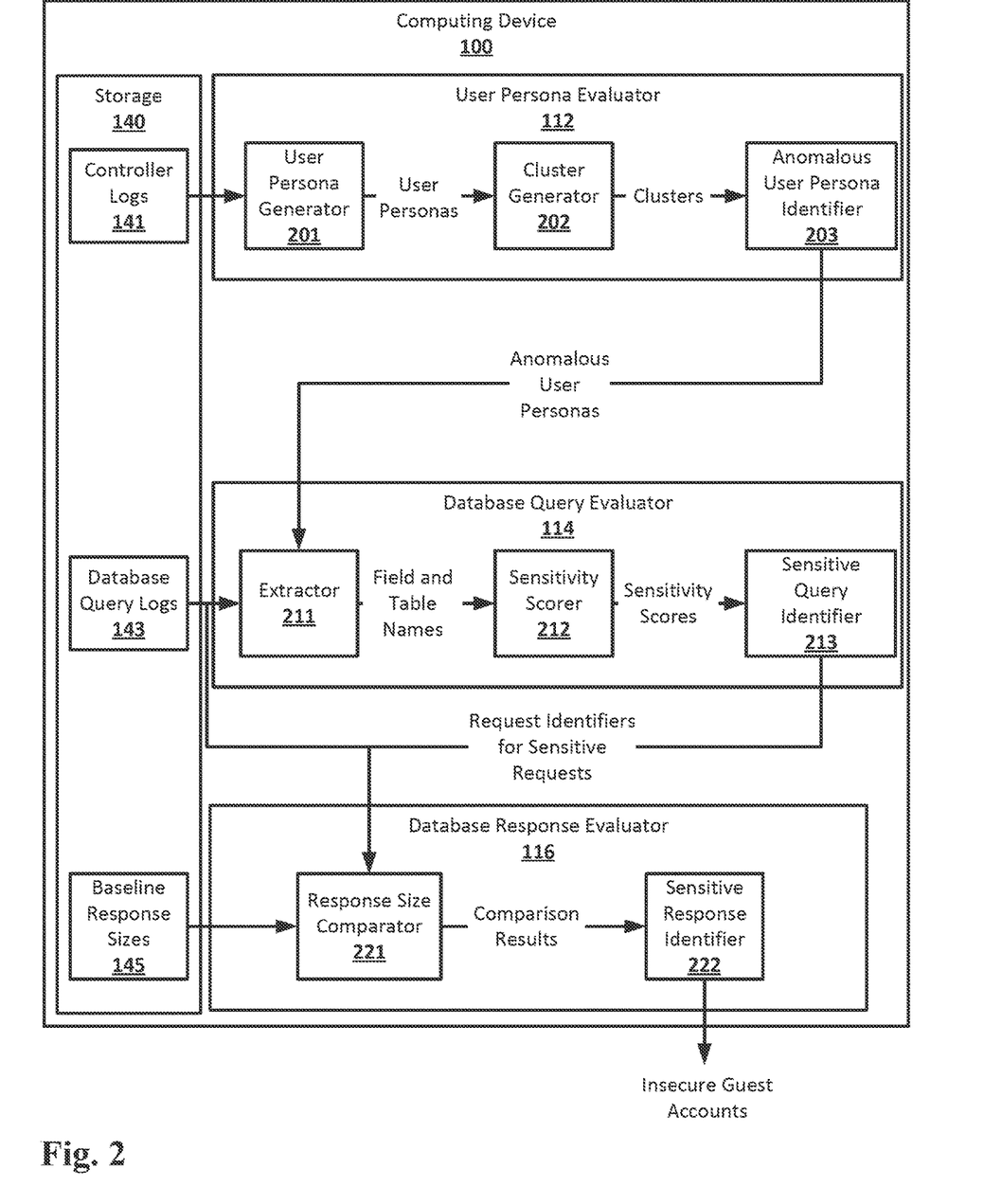
FIG. 2 shows an example arrangement suitable for detecting misconfiguration of guest account security permissions according to an implementation of the disclosed subject matter.

FIG. 2 shows an example arrangement suitable for detecting misconfiguration of guest account security permissions according to an implementation of the disclosed subject matter. The controller logs 141 may be received at a user persona generator 201 of the user persona evaluator 112. The user persona generator 201 may be a component of the user persona evaluator 112 that may generate user personas from entries in the controller logs 141. The entries may include user activity data from user interaction with controllers of applications on the cloud computing server system across all tenants and user accounts. The user persona generator 201 may generate user personas from entries that are associated with guest accounts. The entries that are associated with guest account guest account may be identified by, for example, using tenant identifiers and user identifiers in the entries. The user persona generator 201 may generate the user personas from the entries associated with guest accounts by, for example, aggregating entries that include the same tenant identifier, user identifier, first three octets of an IP address, and user-agent header and detection dates within a specified time window.

The user personas, associated with guest accounts, generated by the user persona generator 201 may be received at a cluster generator 202. The cluster generator 203 may be a component of the user persona evaluator 112 that may generate clusters from the user personas associated with guest accounts. The cluster generator 202 may generate the clusters of user personas using, for example, K-means clustering on the user personas.

The clusters of user personas generated by the cluster generator 202 may be received at the anomalous user persona identifier 203. The anomalous user persona identifier 223 may identify anomalous user personas from the clusters of user personas. The anomalous user persona identifier 203 may, for example, identify a user persona as anomalous when the user persona is in a small cluster, for example, a cluster that includes less than 2% of the user personas associated with guest accounts, or is greater than a specified distance from the center of the user persona's cluster, for example, having a sigmoid of its z-score be greater than 0.98.

The database query logs 143 and the anomalous user personas identified by the anomalous user persona identifier 203 may be received at an extractor 211. The extractor 211 may be a component of the database query evaluator 114 that may compare the request identifiers from the anomalous user personas to request identifiers in entries for database queries in the database query logs 143 and may extract field and table names from database queries from entries whose request identifiers match the request identifiers from the anomalous user personas. A database query in an entry that has a request identifier that matches a request identifier in an anomalous user persona may be associated with that anomalous user persona. The database query may have been made by a user who was using the guest account that is associated with the anomalous user persona.

The field and tables names extracted by the extractor 211 may be received at a sensitivity scorer 212. The sensitivity scorer 212 may be a component of the database query evaluator 114 that may assign sensitivity scores to the field and table names. The sensitivity scorer 212 may be, for example, a large language model tuned specifically to evaluate whether the data that might be stored in a database in particular fields and table names is sensitive by integrating data sensitivity classification information for the cloud computing server system. The sensitivity scorer 212 may assign sensitivity scores on any suitable scale, such as, for example, between 0 and 1.

The sensitivity scores generated by the sensitivity scorer 212 may be received at a sensitive query identifier 213. The sensitive query identifier 213 may identify database queries that requested sensitive data based on the sensitivity scores assigned by the sensitivity scorer 212 to the fields and table names extracted from the database queries by the extractor 211. For example, if the sensitivity scorer 212 assigns scores between 0 and 1, a database query whose extracted fields or table names were either assigned a sensitivity score greater than, for example, 0.9, may be considered to have attempted to access sensitive data, though any other suitable threshold may be used.

The baseline response sizes 145, database query logs 143, and request identifiers for the database queries identified as being sensitive by the sensitive query identifier 213 may be received at a response size comparator 221. The response size comparator 221 may be a component of the database response evaluator 116 that may compare the size of response sent based on a database query to baseline response size for the table that the database query attempted to access data from. The response size comparator 221 may perform comparisons using the response sizes of responses to database queries identified as having requested sensitive data. The response size comparator 221 may use the request identifiers sent from the sensitive query identifier 213 to locate the entries in the database query logs 143 for the database queries that tried to access sensitive data and then may read from these entries the size of the response that was sent. The response size comparator 221 may use the table name of the table the database query attempted to access data from to determine the appropriate baseline response size from the baseline response sizes 145 to use in the comparison. The result of the comparison may be that the response is either greater than the baseline response size by a specified amount, for example, by 20%, or is not.

The comparison results from the response size comparator 221 may be received at a sensitive response identifier 222. The sensitive response identifier 222 may be a component of the database response evaluator 116 that may use the comparison results generated by the response size comparator 221 to identify database queries that attempted to access sensitive data and received responses that were greater than their corresponding baseline response size by some specified amount, indicating that the database query received a response that was not a "no record" response and may have included records with sensitive data that should not be accessible with a guest account. The sensitive response identifier 222 may then identify the insecure guest accounts that were used to submit the database queries that may have received the sensitive data by correlating the request identifiers for the database queries with the anomalous user personas the request identifiers were taken from by the extractor 221 and then determining which guest accounts correspond to the tenant identifiers and user identifiers in those anomalous user personas. Thus, any guest account identified as being insecure, for example, having misconfigured security permissions, may be a guest account that is associated with a user persona that is in turn associated with a database query that requested sensitive data and received a response that was large enough to indicate that the requested sensitive data was returned in response to the query instead of an empty or "no record" response. The computing device 100 may take any suitable action with the insecure guest accounts, including, for example, disabling the use of the insecure guest accounts on the cloud computing server system and notifying any suitable parties of the insecure guest accounts so that they make take appropriate remedial action.

Figure 3:
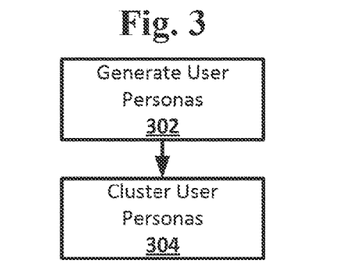
FIG. 3 shows an example arrangement suitable for detecting misconfiguration of guest account security permissions according to an implementation of the disclosed subject matter.

FIG. 3 shows an example procedure suitable for detecting misconfiguration of guest account security permissions according to an implementation of the disclosed subject matter. At 302, user personas may be generated. For example, the user persona evaluator 112 may receive the controller logs 141 and aggregate entries from the controller logs 141 into user personas based on tenant identifiers, user identifiers, the first three octets of IP addresses, user-agent headers, and detection dates. Each user persona may be associated with a guest account for an application of a tenant of a cloud computing sever system, as indicated by the tenant identifier and user identifier of the user persona.

At 304, the user personas may be clustered. For example, the user persona evaluator 112 may generate clusters of the user personas using K-means clustering.

Figure 4:
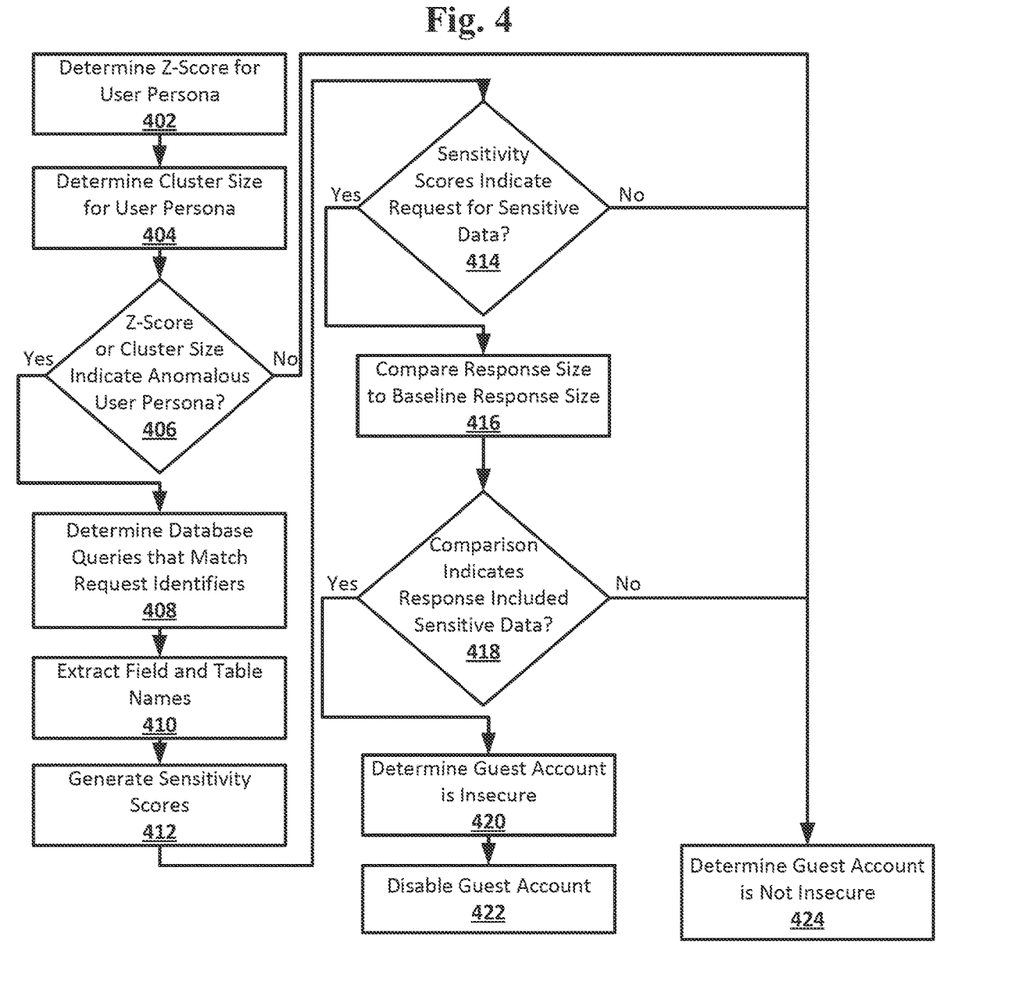
FIG. 4 shows an example arrangement suitable for detecting misconfiguration of guest account security permissions according to an implementation of the disclosed subject matter.

FIG. 4 shows an example procedure suitable for detecting misconfiguration of guest account security permissions according to an implementation of the disclosed subject matter. At 402, a z-score for a user persona may be determined. For example, clusters of user personas associated with guest accounts used for applications on a cloud computing server system may have been generated. The user personas in the clusters may all need to be evaluated to determine whether their associated guest accounts are insecure. To evaluate a single user persona, the user persona evaluator 112 may first determine a z-score for the user persona. The z-score may be a score that indicates how far the user persona is from the center of the cluster that includes the user persona.

At 404, a cluster size for the user persona may be determined. For example, the user persona evaluator 112 may determine the size of the cluster that includes the user persona as the percentage of all user personas that were clustered that are included in the cluster that includes the user persona. For example, the cluster size may be 2% if the cluster that includes the user persona includes 2% of all user personas that were clustered.

At 406, if the z-score or cluster size indicates that the user persona is anomalous, flow may proceed to 408. Otherwise, flow may proceed to 424. For example, the user persona evaluator 112 may determine the z-score or cluster size indicate that the user persona is anomalous if the sigmoid of the z-score for the user persona is greater than a threshold, for example, 0.98, or the cluster size of the cluster including the user persona is less than a threshold, for example, 2%. Otherwise, the user persona evaluator 112 may determine that the user persona is not anomalous.

At 408, database queries that match request identifiers may be determined. For example, the user persona, determined to be anomalous by the user persona evaluator 112, may include any number of request identifiers from the controller log entries that were used to generate the user persona. The database query evaluator 114 may determine entries in the database query logs 143 that have request identifiers that match the request identifiers from the user persona. These entries in the database query logs 143 may include database queries that correspond to the controller log entries that were used to generate the user persona, were made using the guest account associated with the user persona, and are associated with the user persona.

At 410, field and table names may be extracted. For example, the database query evaluator 114 may extract field and table names from the database queries in the database query log entries that had request identifiers that matched request identifiers from the user persona. The extracted field and table names may indicate the fields and tables that the users of the guest account associated with the user persona and whose controller log entries were used to generate the user persona were trying to access in databases of the cloud computing server system through the guest account and its associated application.

At 412, sensitivity scores may be generated. For example, the database query evaluator 114 may assign sensitivity scores to any extracted field and table names. The sensitivity scores may be assigned in any suitable manner, including, for example, using a large language model that may be tuned specifically to evaluate whether the data that might be stored in a database in particular fields and table names is sensitive by integrating data sensitivity classification information for the cloud computing server system. The sensitivity scores may be assigned on any suitable scale, such as, for example, between 0 and 1.

At 414, if any of the sensitivity scores indicate a request for sensitive data was made, flow may proceed 416. Otherwise, if no sensitivity scores indicate a request for sensitive data was made, flow may proceed to 424. For example, if the database query evaluator 114 assigns scores between 0 and 1, any database query whose extracted fields or table names were either assigned a sensitivity score greater than a threshold, for example, 0.9, may be considered to be a request for sensitive data.

At 416, a response size may be compared to a baseline response size. For example, the database response evaluator 114 may have determined that there was at least one database query that is associated with the user persona and was a request for sensitive data. The database query response evaluator 116 may compare the size of the response that was sent in response to the database query with a baseline response size for the table the database query attempted to access data from. The baseline response size may be from the baseline response sizes 145. The size of the response sent in response to the database query may be determined from the entry that includes the database query in the database query logs 143. The baseline response size may be an indication of the size of a response that includes the data in requested by the database query that caused the response.

At 418, if the comparison indicates that the response included sensitive data, flow may proceed to 420. Otherwise, flow may proceed to 424. For example, the database response evaluator 116 may determine that comparison indicates that the response included sensitive data if the size of the response to the database query was more than a threshold percentage, for example, 20%, larger than the baseline response size, as the size of the response may indicate that it included the records, possibly including sensitive data, requested by the database query. Otherwise, a smaller response may indicate that no sensitive data was received, for example, the response may have been a "no records" response.

At 420, the guest account may be determined to be insecure. For example, the user persona may have been determined to be anomalous and associated with a database query that requested sensitive data and received a response large enough to indicate that it included the requested sensitive data. The security misconfiguration detector 110 may determine that the guest account associated with the user persona is insecure. The security permissions for the guest account may have been misconfigured to be overpermissive by the tenant whose application the guest account is used to access, allowing the guest account to be used to access sensitive data in databases of the cloud computing server system.

At 422, the insecure guest account may be disabled. For example, the security misconfiguration detector 110 may disable the use of the guest account that the security misconfiguration detector 110 determined to be insecure. Disabling the guest account may prevent any users from using the guest account to access the application that guest account was previously used to access. This may prevent the guest account from being used to access to sensitive data in the databases of the cloud computing server system. The security misconfiguration detector 110 may also notify any suitable parties, such as the tenant whose application the guest account was used to access or parties responsible for the security of the cloud computing server system, that the guest account is insecure. This may allow for other appropriate remedial action to be taken. Instead of disabling the guest account, the security misconfiguration detector 110 may change the security permissions of the guest account, for example, making the security permissions more restrictive to prevent the guest account from being used to access sensitive data.

At 424, the guest account may be determined to not be insecure. For example, either the user persona associated with the guest account was determined to be not anomalous, to be anomalous but associated with no database queries that requested sensitive data, or to be anomalous and associated with database queries that requested sensitive data but none of which received a response of a size that indicated that it included sensitive data. The security misconfiguration detector 110 may consider the guest account to have properly configured security permissions and may take no action.

Figure 5:
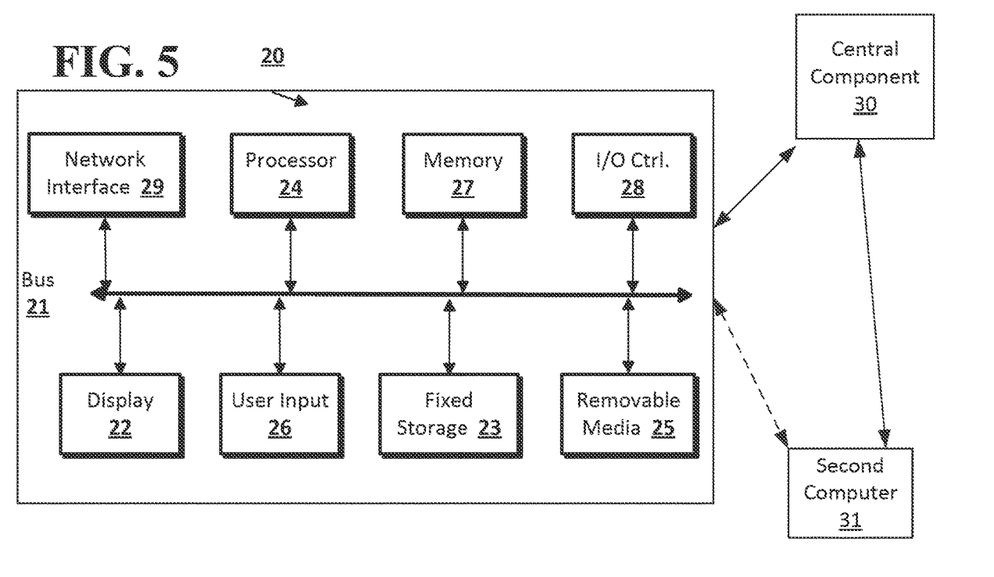
FIG. 5 shows a computer according to an implementation of the disclosed subject matter.

Implementations of the presently disclosed subject matter may be implemented in and used with a variety of component and network architectures. FIG. 5 is an example computer 20 suitable for implementing implementations of the presently disclosed subject matter. As discussed in further detail herein, the computer 20 may be a single computer in a network of multiple computers. As shown in FIG. 5, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 6.

Many other devices or components (not shown) may be connected in a similar manner (e.g., document scanners, digital cameras and so on). Conversely, all of the components shown in FIG. 5 need not be present to practice the present disclosure. The components can be interconnected in different ways from that shown. The operation of a computer such as that shown in FIG. 5 is readily known in the art and is not discussed in detail in this application. Code to implement the present disclosure can be stored in computer-readable storage media such as one or more of the memory 27, fixed storage 23, removable media 25, or on a remote storage location.

Figure 6:
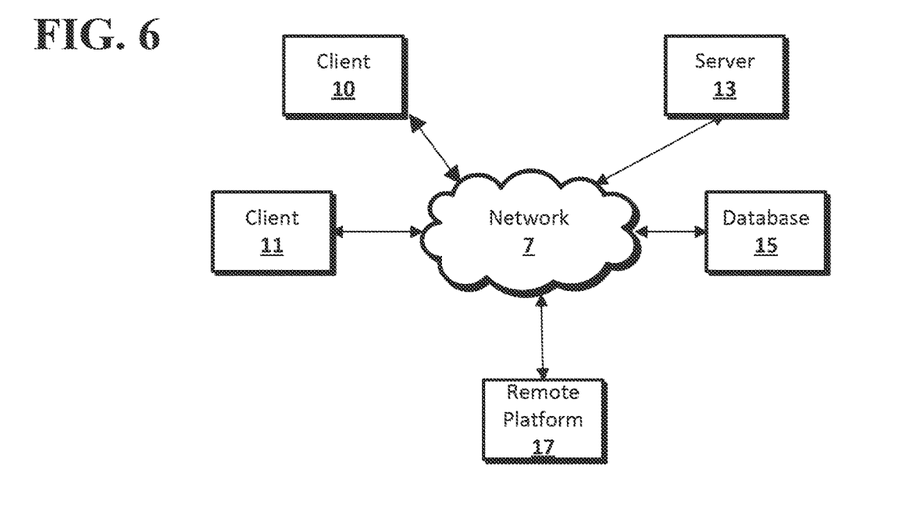
FIG. 6 shows a network configuration according to an implementation of the disclosed subject matter.

FIG. 6 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
generating user personas from user activity data generated by access using guest accounts to controllers of a cloud computing server system, wherein guest accounts provide access to respective applications hosted on the cloud computing server system, and wherein the user personas are associated with the guest accounts;
generating clusters of user personas from the user personas;
identifying anomalous user personas based on the clusters of user personas;
identifying from database query logs at least one database query that was made to a database of the cloud computing server system, is associated with at least one of the identified user personas, and requested sensitive data;
identifying from the database query logs a size of a response from the database to the identified at least one database query wherein the size of the response indicates that the response included the sensitive data that was requested in the at least one database query; and
preventing, by the cloud computing server system, use of the one of the guest accounts associated with the user persona that was identified as anomalous and is associated with identified at least one database query that received at least one identified response.

2. The computer-implemented method of claim 1, wherein generating user personas from user activity data generated by access using guest accounts to controllers of a cloud computing server system further comprises generating a user persona associated with one of the guest accounts by aggregating from controller logs of the controllers of the cloud computing server system IP addresses, user-agent headers, tenant identifiers, user identifiers, and dates of detection of access to the controllers.

3. The computer-implemented method of claim 1, wherein identifying anomalous user personas based on the clusters of user personas further comprises determining which of the user personas are in clusters that includes less than a threshold percentage of all of the user personas and determining which of the user personas are a more than threshold distance from the center of cluster which the user personas are part of.

4. The computer-implemented method of claim 1, wherein identifying from database query logs at least one database query to a database of the cloud computing server system that is associated with at least one of the identified user personas and requested sensitive data further comprises determining a sensitivity score for the at least one database query using a large language model and field and table names of the at least one database query.

5. The computer-implemented method of claim 1, wherein identifying from application logs a response from the database to the identified at least one database query wherein a size of the response indicates that the response included the sensitive data that was requested in the at least one database query further comprises comparing the size of the response to a baseline size of a response indicating that no record was found in the database.

6. The computer-implemented method of claim 1, further comprising changing, by the cloud computing server system, the security permissions of the one of the guest accounts associated with the user persona that was identified as anomalous and is associated with identified at least one database query.

7. The computer-implemented method of claim 1, wherein the sensitive data comprises customer data or payment data.

8. A computer-implemented system comprising:
a storage; and
a processor that generates user personas from user activity data generated by access using guest accounts to controllers of a cloud computing server system, wherein guest accounts provide access to respective applications hosted on the cloud computing server system, and wherein the user personas are associated with the guest accounts,
generates clusters of user personas from the user personas,
identifies anomalous user personas based on the clusters of user personas,
identifies from database query logs at least one database query that was made to a database of the cloud computing server system, is associated with at least one of the identified user personas, and requested sensitive data,
identifies from the database query logs a size of a response from the database to the identified at least one database query wherein the size of the response indicates that the response included the sensitive data that was requested in the at least one database query, and
prevents, by the cloud computing server system, use of the one of the guest accounts associated with the user persona that was identified as anomalous and is associated with identified at least one database query that received at least one identified response.

9. The computer-implemented system of claim 8, wherein the processor generates user personas from user activity data generated by access using guest accounts to controllers of a cloud computing server system by generating a user persona associated with one of the guest accounts by aggregating from controller logs of the controllers of the cloud computing server system IP addresses, user-agent headers, tenant identifiers, user identifiers, and dates of detection of access to the controllers.

10. The computer-implemented system of claim 8, wherein the processor identifies anomalous user personas based on the clusters of user personas by determining which of the user personas are in clusters that includes less than a threshold percentage of all of the user personas and determining which of the user personas are a more than threshold distance from the center of cluster which the user personas are part of.

11. The computer-implemented system of claim 8, wherein the processor identifies from application logs a response from the database to the identified at least one database query wherein a size of the response indicates that the response included the sensitive data that was requested in the at least one database query by comparing the size of the response to a baseline size of a response indicating that no record was found in the database.

12. The computer-implemented system of claim 8, wherein the processor further changes, by the cloud computing server system, the security permissions of the one of the guest accounts associated with the user persona that was identified as anomalous and is associated with identified at least one database query.

13. The computer-implemented system of claim 8, wherein the one or more processors generate the second hash tree by using the batch identifiers and the ordinal identifiers from the records.

14. The computer-implemented system of claim 8, wherein the sensitive data comprises customer data or payment data.

15. A system comprising: one or more computers and one or more non-transitory storage devices storing instructions which are operable, when executed by the one or more computers, to cause the one or more computers to perform operations comprising:
generating user personas from user activity data generated by access using guest accounts to controllers of a cloud computing server system, wherein guest accounts provide access to respective applications hosted on the cloud computing server system, and wherein the user personas are associated with the guest accounts;
generating clusters of user personas from the user personas;
identifying anomalous user personas based on the clusters of user personas;
identifying from database query logs at least one database query that was made to a database of the cloud computing server system, is associated with at least one of the identified user personas, and requested sensitive data;
identifying from the database query logs a size of a response from the database to the identified at least one database query wherein the size of the response indicates that the response included the sensitive data that was requested in the at least one database query; and
preventing, by the cloud computing server system, use of the one of the guest accounts associated with the user persona that was identified as anomalous and is associated with identified at least one database query that received at least one identified response.

16. The system of claim 15, wherein the instructions which are operable, when executed by the one or more computers, to cause the one or more computers to perform operations comprising generating user personas from user activity data generated by access using guest accounts to controllers of a cloud computing server system further cause the one or more computers to perform operations comprising generating a user persona associated with one of the guest accounts by aggregating from controller logs of the controllers of the cloud computing server system IP addresses, user-agent headers, tenant identifiers, user identifiers, and dates of detection of access to the controllers.

17. The system of claim 15, wherein the instructions which are operable, when executed by the one or more computers, to cause the one or more computers to perform operations comprising identifying anomalous user personas based on the clusters of user personas further cause the one or more computers to perform operations comprising determining which of the user personas are in clusters that includes less than a threshold percentage of all of the user personas and determining which of the user personas are a more than threshold distance from the center of cluster which the user personas are part of.

18. The system of claim 15, wherein the instructions which are operable, when executed by the one or more computers, to cause the one or more computers to perform operations comprising identifying from database query logs at least one database query to a database of the cloud computing server system that is associated with at least one of the identified user personas and requested sensitive data further cause the one or more computers to perform operations comprising determining a sensitivity score for the at least one database query using a large language model and field and table names of the at least one database query.

19. The system of claim 15, wherein the instructions which are operable, when executed by the one or more computers, to cause the one or more computers to perform operations comprising identifying from application logs a response from the database to the identified at least one database query wherein a size of the response indicates that the response included the sensitive data that was requested in the at least one database query further cause the one or more computers to perform operations comprising comparing the size of the response to a baseline size of a response indicating that no record was found in the database.

20. The system of claim 15, wherein the instructions which are operable, when executed by the one or more computers, to cause the one or more computers to perform operations further cause the one or more computers to perform operations comprising changing, by the cloud computing server system, the security permissions of the one of the guest accounts associated with the user persona that was identified as anomalous and is associated with identified at least one database query.

* * * * *